United States Patent [19]
Jobe

[11] 3,881,344
[45] May 6, 1975

[54] MONITOR FOR CONTINUOUSLY MEASURING SURFACE TENSION OF LIQUIDS

[75] Inventor: John D. Jobe, Deer Park, Tex.

[73] Assignee: Shell Oil Company, Houston, Tex.

[22] Filed: Apr. 16, 1973

[21] Appl. No.: 351,737

[52] U.S. Cl. ................................................. 73/64.4
[51] Int. Cl. ............................................ G01n 13/02
[58] Field of Search ............................. 73/64.4, 439

[56] References Cited
UNITED STATES PATENTS

| | | | |
|---|---|---|---|
| 2,448,768 | 9/1948 | Cassel | 73/64.4 |
| 3,426,584 | 2/1969 | Smith | 73/64.4 |
| 3,765,227 | 10/1973 | Campbell et al. | 73/64.4 |
| 3,780,568 | 12/1973 | Goldmann et al. | 73/64.4 |

FOREIGN PATENTS OR APPLICATIONS

| | | | |
|---|---|---|---|
| 1,167,066 | 6/1961 | Germany | 73/64.4 |
| 154,441 | 3/1963 | U.S.S.R. | 73/64.4 |

*Primary Examiner*—Jerry W. Myracle
*Assistant Examiner*—Joseph W. Roskos

[57] ABSTRACT

An apparatus for measuring the surface tension of a liquid in a flowing stream wherein a capillary tube is dipped in the liquid and a bubble formed on the end of the tube by forcing air down the tube. The pressure required to form the bubble below the liquid surface is related to the surface tension of the liquid.

5 Claims, 3 Drawing Figures

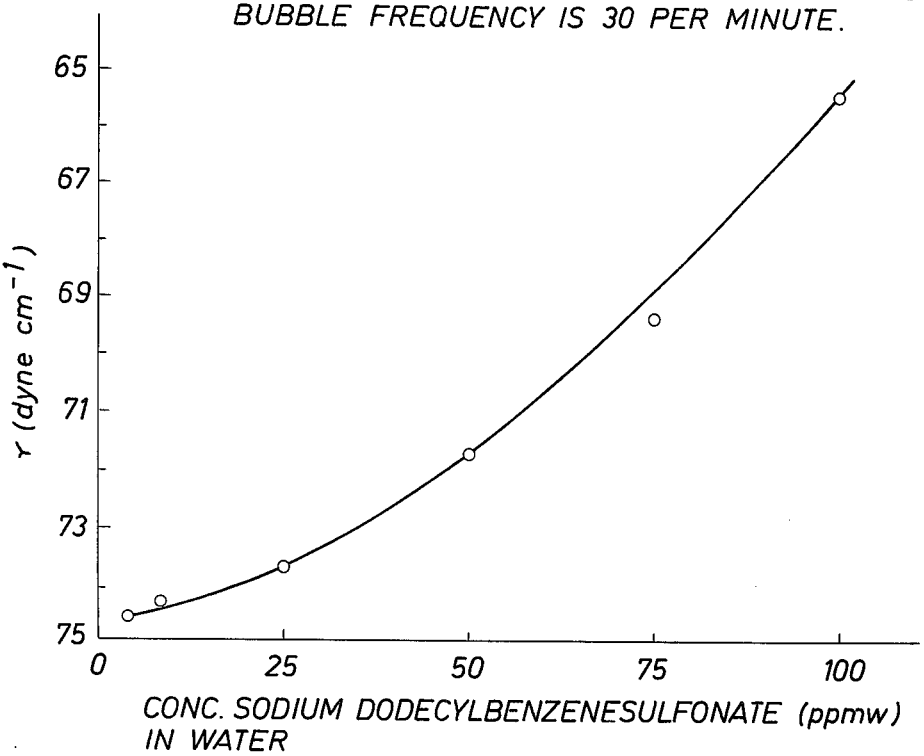
FIG. 2 SURFACE TENSION $\gamma$ AS A FUNCTION OF SURFACTANT CONCENTRATION IN 1.6 % WT. NaOH. BUBBLE FREQUENCY IS 30 PER MINUTE.
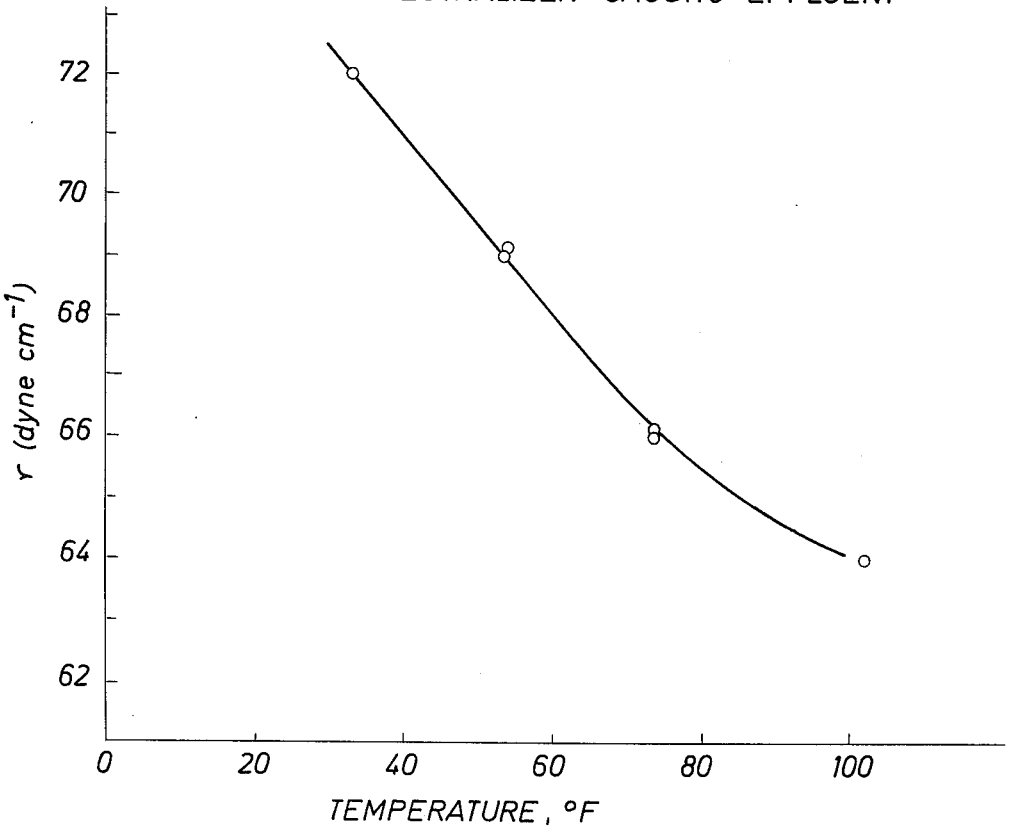
FIG. 3 EFFECT OF TEMPERATURE ON SURFACE TENSION OF ALKYLATION NEUTRALIZER CAUSTIC EFFLUENT 3,881,344

MONITOR FOR CONTINUOUSLY MEASURING SURFACE TENSION OF LIQUIDS

BACKGROUND OF THE INVENTION

In many chemical and petroleum processes it would be very desirable to be able to measure surface tension continuously to obtain some indication of the amount of surface active agents, referred to as surfactants, in various process stream. The presence of a surfactant in a process stream, of course, can decrease the surface tension of the liquid and a measurement of surface tension can be correlated with the surfactant concentration in the process stream. Thus, when the processes have streams in which the presence of a surfactant is detrimental simple measurements of surface tension can be used to monitor the presence of surfactants.

An example of the above type of process stream is the caustic neutralizer stream in an alkylation plant. The presence of surfactants in the neutralizer stream is detrimental and some means would be desirable for monitoring the surfactant level. Also, the presence of some surfactants in boiler feed water can cause foaming in the boiler tubes and possible damage to the boiler. In a chemical or petroleum plant installation it is possible to have leaks in various condensers and cooling devices that will allow surfactants to contaminate the steam condensate and render it unfit for use as boiler feed water.

In the past, various laboratory instruments have been developed for measuring surface tension of liquids. One such method used in the laboratories consisted of measuring the pressure required to form a bubble of the liquid on the end of a small tube or capillary. This pressure can be correlated directly with the surface tension of the liquid by the following formula: $P = 2\gamma/r$, in which $P$ = pressure, $\gamma$ = surface tension, and $r$ = capillary radius.

BRIEF SUMMARY OF THE INVENTION

The present invention solves the above problems by automating the previous laboratory method. More particularly, the invention uses a sample cell with means for supplying continuous metered flow of the liquid to be tested. A small probe, for example a capillary tube, extends into the cell and is supplied with a metered amount of compressed air at a constant rate. The compressed air forms a bubble on the end of the probe with the pressure of the bubble being related to the surface tension of the liquid.

The pressure required to form the bubble is measured by means of a pressure transmitter which, in addition, amplifies the measured pressure. The amplified pressure is supplied as a pneumatic signal to a chart recorder which records the pressure. Preferably, the chart recorder is a circular type recorder driven by means of a clockwork mechanism and responsive to variations in pressure.

BRIEF DESCRIPTION OF THE DRAWINGS

The present invention will be more easily understood in the following detailed description of a preferred embodiment when taken into conjunction with the attached drawings in which:

FIG. 2 is a curve showing the response of the instrument to various concentrations of a surface active agent; and FIG. 3 is a curve showing the variation in the major surface tension with variations in the temperature of the liquid.

DESCRIPTION OF PREFERRED EMBODIMENT

Figure 1:
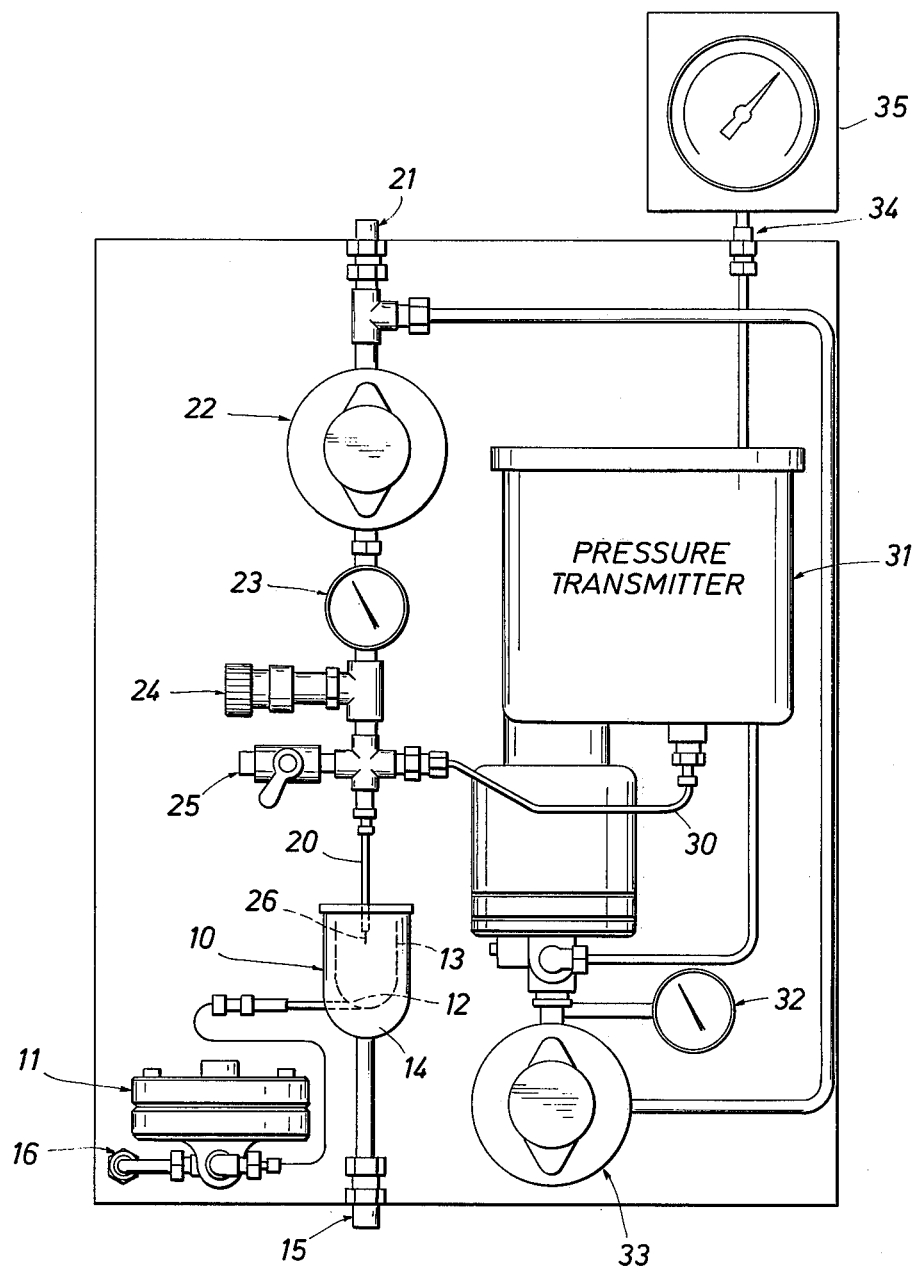
FIG. 1 is an elevation view of an instrument constructed according to the present invention.

Referring now to FIG. 1 there is shown an instrument constructed according to the present invention. More particularly, the sample cell 10 is supplied with a continuous sample of the liquid by a sample inlet line 16 having a flow regulator 11 disposed therein. The flow regulator controls the flow of sample; however, surface tension readings are not particularly flow sensitive. For example, a flow of 5 to 25 ml per minute is satisfactory when the sample cell contains 5 cubic centimeters. The discharge side of the regulator is coupled to an inner cup 13 by means of an opening 12 near the bottom of the inner cup. The sample overflows the top of the inner cup and is drained from the bottom 14 of the sample cell by a drain line 15. A continuous sample of the liquid is supplied to the sample cell with a fixed volume being retained within the sample cell. The meniscus of the liquid in the inner cup remains at constant distance, approximately 1 mm, above the bottom of the capillary.

A probe 20 contains a capillary tube, preferably a flourinated polymer plastic, such that the capillary tip 26 extends below the liquid surface in the sample cell. The capillary may be any desired size, for example, 0.010 inch inside diameter capillary tubing has been found satisfactory when a sample of the above size is used. The use of the flourinated polymer plastic capillary is important since glass or metal tips tend to interact unpredictably with some samples and prevent repeatability of the results. The probe is supplied with compressed air by a supply line 21 having pressure regulator 22 disposed therein. The pressure regulator is set to control the pressure in the range of 1 to 10 lbs per square inch. Pressure gauge 23 is provided for setting this pressure while a micrometer needle valve 24 controls the flow of compressed air to the capillary tube. Thus, the needle valve provides a means for adjusting the bubble formation frequency. A vent line 25 is for venting the system when the pressure transmitter is adjusted for a zero setting.

The probe is coupled by means of a line 30 to a Moore pressure transmitter 31. For example, a Moore pressure transmitter known as model SD 174-5 manufactured by the Moore Products Company of Spring House, Pa., may be used. The pressure transmitter is supplied with clean compressed air from the same source as used for the probe. The pressure regulator 33 controls the pressure to the pressure transmitter while a gauge 32 is utilized for adjusting the pressure. The pressure transmitter supplies a pneumatic signal to a line 34. The signal may be recorded by chart recorder 35. Preferably, the chart recorder 35 is of the type which utilizes a clockwork or pneumatic timer for driving the chart while the pen is positioned in response to the pressure. The instrument is thus completely pneumatic.

To operate the above apparatus, only a supply of liquid to be tested and a supply of compressed air are required. When these are connected to the proper inlets on the apparatus, it is ready for operation. The apparatus may be zeroed by adjusting the transmitter with the vent valve opened. The apparatus may be calibrated by introducing a liquid of known surface tension, such as water, and adjusting the transmitter span so that the instrument output corresponds to the known surface tension.

In the absence of surface active agents, the surface tension readings of liquids will be independent of the length of time between bubbles. However, if surface active compounds are present, the surface tension at the bubble interface will depend on the rate of diffusion of the surface active agents to the interface. Consequently, for a constant surfactant concentration, the surface tension readings will tend to decrease as the bubble formation frequency decreases. Therefore, it is desirable to operate the instrument at a fixed bubble frequency when monitoring liquids containing surface active agents. If the bubble frequency is high, on the order of 10 bubbles per second, the instrument will show more sensitivity to the faster diffusing surfactants. A typical bubble frequency which is relatively easy to maintain is on the order of 30 bubbles per minute.

FIG. 2 illustrates the response of the instrument to various concentrations of a particular surface active agent at a bubble frequency of 30 per minute. As shown, the surface tension increases markedly as the concentration of the surfactant decreases. More particularly, there is shown various concentrations of the surfactant sodium dodecylbenzesulfonate in a 1.6 percent by weight solution of sodium hydroxide in water. This concentration of sodium hydroxide is within the range of the caustic that is normally encountered in an alkylation unit in a petroleum refinery.

FIG. 3 illustrates the variation in surface tension due to variations in the temperature of a particular sample liquid. From this it is readily seen that a variation in temperature of 10°F can produce approximately a 2 percent change in the surface tension. Thus, under normal operating conditions there is no need for temperature correction of the apparatus. Of course, if a greater temperature variation occurs in its normal operating conditions some provision must be made for temperature control.

I claim as my invention:

1. An apparatus for measuring the surface tension of a liquid comprising:
   a closed cylindrical housing having an outlet disposed in the bottom thereof;
   an open top sample cell mounted within said housing and having an inlet disposed in the bottom thereof;
   liquid supply means communicating with the inlet of said sample cell for supplying a sample of the liquid to the sample cell, said liquid supply means including flow control means for establishing a constant flow of liquid through said sample cell;
   an elongated tubular probe member mounted in said housing and having a first open end extending below the top of said sample cell;
   supply means communicating with the other end of said probe for supplying a compressed gas to the probe to form a bubble of said gas on said first end of said probe; and
   measuring means disposed to measure the pressure of said gas required to form a bubble in said liquid.

2. The apparatus of claim 1 wherein said probe comprises a capillary tube.

3. The apparatus of claim 1 wherein said compressed gas is compressed air having a regulated pressure and constant flow rate and said measuring means includes a pneumatic pressure transmitter for detecting the pressure required to form the bubble.

4. The apparatus of claim 3 and in addition a recording means, said pneumatic transmitter being coupled to said recording means to record the pressure required to form a bubble in the liquid.

5. The apparatus of claim 4 wherein said pressure transmitter amplifies the detected pressure and said recorder is a pneumatic recorder.

* * * * *